: US 6,353,589 B1
: Mar. 5, 2002

(54) PICKUP GUIDE MECHANISM

(75) Inventors: Jun Togashi; Kiyoshi Morikawa; Satoru Anada; Hideki Kinoshita; Takashi Ota, all of Saitama (JP)

(73) Assignee: Pioneer Corporation, Tokyo (JP)

(*) Notice: Subject to any disclaimer, the term of this patent is extended or adjusted under 35 U.S.C. 154(b) by 0 days.

(21) Appl. No.: 09/533,662

(22) Filed: Mar. 23, 2000

(30) Foreign Application Priority Data

Mar. 23, 1999 (JP) .................................... 11-078025

(51) Int. Cl.⁷ .................................................. G11B 17/30
(52) U.S. Cl. ...................................................... 369/219
(58) Field of Search ................................ 369/219, 215; 360/290, 267.3, 294.1

(56) References Cited

U.S. PATENT DOCUMENTS 4,996,619 A * 2/1991 Negishi et al. ............. 360/109

* cited by examiner

Primary Examiner—George J. Letscher
(74) Attorney, Agent, or Firm—Sughrue Mion, PLLC

(57) ABSTRACT

A pickup guide mechanism in which a shaft for guiding a pickup is arranged over an opening formed on a chassis and the shaft is fixed to the chassis by a fixing unit. The fixing unit includes a countersunk head screw, which is screwed to the chassis, the tapered face of the head portion of which pushes an end portion of the guide shaft, wherein the taper angle of the tapered face of the head portion exceeds 90°.

2 Claims, 6 Drawing Sheets

PICKUP GUIDE MECHANISM

BACKGROUND OF THE INVENTION

1. Field of the Invention

The present invention relates to a guide mechanism for guiding a pickup. For example, the present invention relates to a guide mechanism for guiding a pickup with respect to an information recording face of an optical disk when it is applied to an optical disk reproducing device or an optical disk recording device.

2. Description of the Related Art

Conventionally, an optical disk reproducing device such as a CD player is capable of accurately reading information recorded on a CD as follows. When the CD on which a row of pits having information are spirally recorded is rotated by a spindle motor, the row of pits form a track of information to be scanned. While the track of information is accurately followed in the radial direction of the disk by a pickup attached to a pickup guide mechanism fixed to a casing of the CD player, the row of pits to be scanned can be optically read in order. In this way, information recorded on the CD can be read.

FIG. 4 is a view showing the above conventional pickup guide mechanism. On the chassis 101 of the pickup guide mechanism 100, there is provided a shaft presser 103 to which a rod-shaped guide shaft 102, the rigidity of which is high, is attached. When a recessed portion of the shaft presser 103 comes into contact with one end portion of the guide shaft 102, the guide shaft 102 can be positioned, and also when the other end portion of the guide shaft 102 is fixed by a countersunk head screw 104 screwed into a screw hole formed on the chassis 101, the guide shaft 102 can be arranged over an opening formed on the chassis, so that the guide shaft 102 can be positioned in the radial direction of a disk, that is, the guide shaft 102 can be positioned in the direction of arrow A. In this way, the guide shaft 102 can be fixed at a predetermined position shown in FIG. 4.

For example, as shown in FIG. 4, the shaft presser 103 is made of resin by means of molding, and the bottom portion of the shaft presser 103 is fixed onto the chassis 101. Alternatively, the shaft presser 103 may be formed by raising a portion of the chassis 101.

A pickup 105 is slidably supported by the guide shaft 102. When a drive force of a carriage motor 106 is transmitted to a rack 108, which is fixed to the pickup 105, via a gear 107, an objective lens 109 of the pickup 105 can be moved in the radial direction of the disk.

FIG. 5 is a view showing the guide shaft 102 fixed onto the chassis 101 by the countersunk head screw 104. The profile of the head portion of the countersunk head screw 104 is formed into a substantial cone shape having a tapered face. Taper angle θ of the tapered face of the head portion of the countersunk head screw 104 is 90° by the standard size according to JIS (Japanese Industrial Standard), and the allowance does not exceed 90°.

The central axis of the countersunk head screw 104, which is screwed to the chassis 101, is located at a predetermined position on central axis X of the guide shaft 102 as shown in FIG. 4, and the central axis of the countersunk head screw 104 makes a right angle with central axis X of the guide shaft 102.

Therefore, when the countersunk head screw 104 is screwed to the chassis 101, the highest portion of one end of the guide shaft 102 comes into contact with an inclined face (tapered face) of the head portion of the countersunk head screw 104 forming angle θ. Therefore, the highest portion of one end of the guide shaft 102 is pushed by force F of the tapered face. In this case, force F of the tapered face is perpendicular to the tapered face.

Component force Fz of force F, the direction of which is vertical, fastens one end portion of the guide shaft 102 by the countersunk head screw 104 and the chassis 101, so that the guide shaft 102 can be fixed onto the chassis 101 by this fastening force Fz. Component force Fxy of force F, the direction of which is horizontal, pushes the other end portion of the guide shaft 102 against the shaft presser 103, so that the guide shaft 102 can be positioned in the radial direction of the disk by this component force Fxy of force F.

In this case, as can be seen in FIG. 5, an angle formed between force F, which is perpendicular to the tapered face, and component force Fxy, which is horizontal, is θ/2. Accordingly, for example, when angle θ of the head portion of the countersunk head screw 104 is a standard size (90°), the angle formed between force F, which is perpendicular to the tapered face, and component force Fxy, which is horizontal, becomes 45°. Therefore, the intensity of component force Fz and that of component force Fxy become equal to each other.

In the case where angle θ of the head portion of the countersunk head screw 104 is formed in an allowance which deviates from the standard size, the angle formed between force F, which is perpendicular to the tapered face, and component force Fxy, which is horizontal, becomes smaller than 45°. In this case, an intensity of component force Fxy becomes a little lower than that of component force Fz.

When the guide shaft 102 receives this fastening force Fz and this pushing force Fxy, it can be fixed to a predetermined position on the chassis 101.

When it is estimated that the CD player on which the pickup guide mechanism is mounted is incorporated into a vehicle or used as a portable CD player, it is necessary to give a sufficiently high intensity of fastening force so that the guide shaft 102 can not be easily disconnected from the chassis 101 even if it is given external vibration or shock caused when the CD player is carelessly dropped.

In this connection, as described before, since angle θ of the head portion of the countersunk head screw 104 is 90°, the intensity of component force Fz and that of that of component force Fxy necessarily become equal to each other. Therefore, when the countersunk head screw 104 is screwed into the chassis 101 so as to provide a sufficiently high fastening force, the pushing force is also increased.

When the pushing force is increased, a load given to the shaft presser 103 is also increased. Therefore, it is impossible for the shaft presser 103 to withstand the load, and the shaft presser 103 is plastically deformed. FIG. 6 is a view showing a state in which the shaft presser 103 is deformed as described above.

As shown in FIG. 6, when one end portion of the guide shaft 102 is pushed by force F', which is sufficiently higher than force F, by the inclined face of the head of the countersunk head screw 104, pushing force F'xy, which is sufficiently higher than pushing force Fxy, of a component force of force F' is generated, and also pushing force F'z, which is sufficiently higher than pushing force Fz, of a component force of force F' is generated.

As a result, the guide shaft 102 pushes the shaft presser 103 by pushing force F'xy. However, the shaft presser 103 can not withstand this pushing force F'xy. Therefore, the guide presser 103 is deformed being pushed by the guide shaft 102. At the same time, the guide shaft 102 is pushed in the thrust direction by the inclined face of the head portion of the countersunk head screw 104 which gradually proceeds downward being screwed into the chassis 101. As a result, the guide shaft 102 deviates from a predetermined position.

As a result, not only the shaft presser 103 of the pickup guide mechanism is damaged but also the chassis 101 is deformed under certain circumstances, and it becomes impossible for the guide shaft 102 to be stably fixed at the predetermined position on the chassis 101.

For the above reasons, in the conventional pickup guide mechanism, only pushing force Fxy, the intensity of which is kept in a range by which the shaft presser 103 is not deformed, can be given to the guide shaft 102. As a result, it is impossible for the guide shaft 102 to be fixed onto the chassis 101 by a sufficiently high intensity of force Fz. Accordingly, there is a limitation in increasing the mechanical strength of the pickup guide mechanism so that it can withstand the vibration and shock given from the outside.

SUMMARY OF THE INVENTION

The present invention has been made in view of the above problems. It is an object of the present invention to provide a pickup guide mechanism, the guide shaft of the pickup of which can be stably fixed at a predetermined position on the chassis by a sufficiently high intensity of fastening force, so that the pickup guide mechanism can withstand vibration and shock given from the outside.

In order to achieve the above object, according to a first aspect of the invention, there is provided a pickup guide mechanism comprising: a shaft for guiding a pickup over an opening formed on a chassis; and fixing means for fixing the shaft to the chassis, the fixing means including a countersunk head screw, which is screwed to the chassis, a tapered face of a head portion of which pushes an end portion of the guide shaft, wherein the taper angle of the tapered face of the head portion exceeds 90°.

Due to the foregoing, by the pushing force of the tapered face of the head portion of the countersunk head screw which pushes one end portion of the guide shaft, it is possible to obtain a component force (pushing force) by which one end portion of the guide shaft is pushed in the horizontal direction of the fixing means so that no play is created in the guide shaft. Further, it is possible to increase an intensity of the component force (fastening force) for fixing the guide shaft to the chassis by fastening the guide shaft with the countersunk head screw and the chassis as compared with an intensity of the pushing force. Therefore, the guide shaft can be stably positioned by the pushing force without causing any play, and further the guide shaft can be fixed to the chassis by a sufficiently high intensity of fastening force. As a result, the pickup guide mechanism can be stably fixed at a predetermined position on the chassis while a sufficiently high intensity of fastening force is given to the guide shaft without causing any damage in each portion of the pickup guide mechanism.

According to a second aspect of the invention, there is provided a pickup guide mechanism comprising: a shaft for guiding a pickup over an opening formed on a chassis; and fixing means for fixing the shaft to the chassis, the fixing means including a presser section, which is arranged on the chassis, coming into contact with one end portion of the guide shaft and positioning the guide shaft, and a countersunk head screw, which is screwed to the chassis, a tapered face of a head portion of which pushes the other end portion of the guide shaft toward the presser section, wherein the taper angle of the tapered face of the head portion exceeds 90°.

Due to the foregoing, by the pushing force of the tapered face of the head portion of the countersunk head screw which pushes one end portion of the guide shaft, it is possible to obtain a component force (pushing force) by which one end portion of the guide shaft of the fixing means is pushed in the horizontal direction so that no play is created in the guide shaft. Further, it is possible to increase an intensity of the component force (fastening force) for fixing the guide shaft to the chassis by fastening the guide shaft with the countersunk head screw and the chassis as compared with an intensity of the pushing force. Therefore, the guide shaft can be stably positioned by the pushing force without causing any play, and further the guide shaft can be fixed to the chassis by a sufficiently high intensity of fastening force. As a result, the pickup guide mechanism can be stably fixed at a predetermined position on the chassis while a sufficiently high intensity of fastening force is given to the guide shaft without causing any damage in each portion of the pickup guide mechanism.

DETAILED DESCRIPTION OF THE PREFERRED EMBODIMENTS

Figure 1:
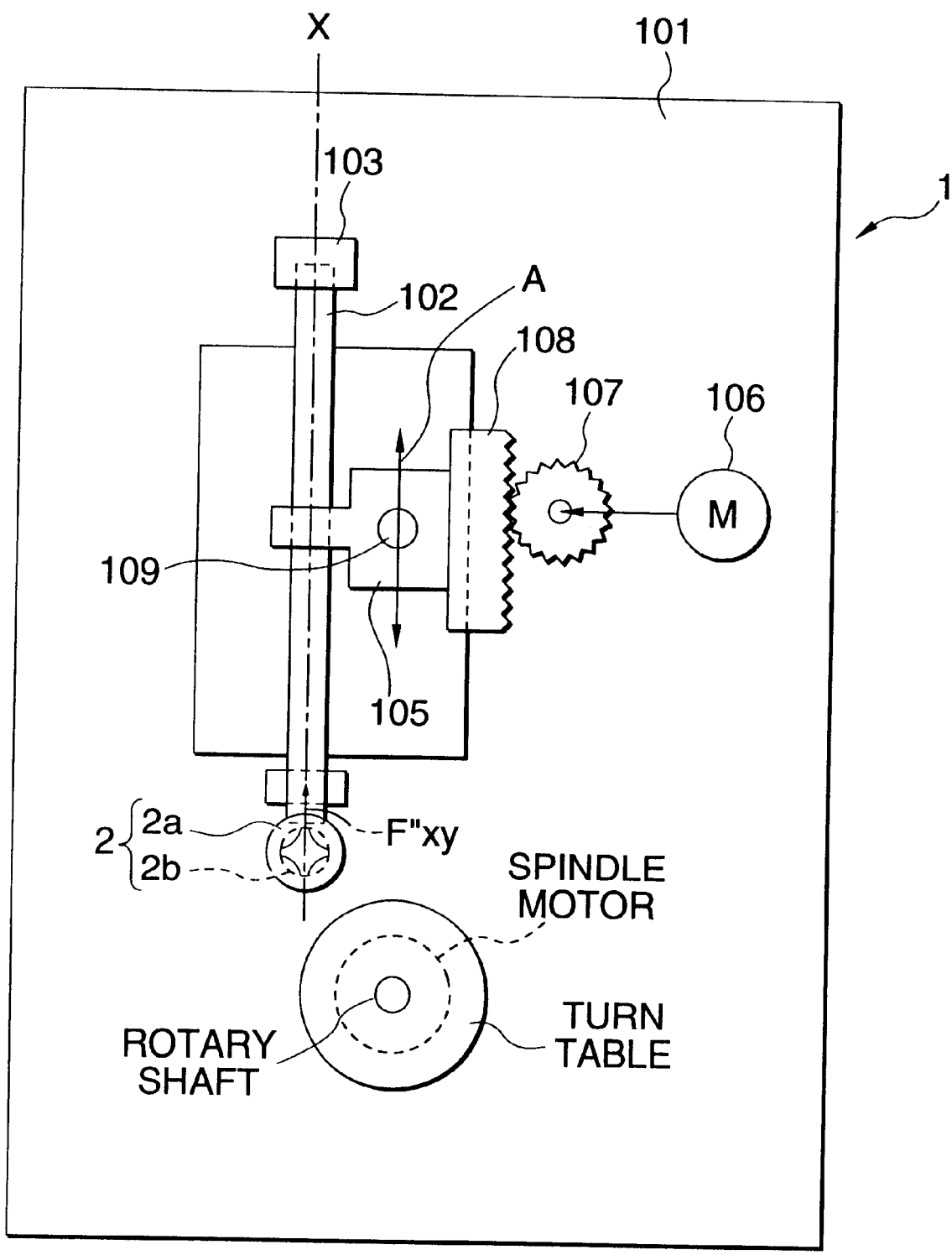
FIG. 1 is a view showing a pickup guide mechanism of an embodiment of the present invention.

Next, referring to FIGS. 1 and 2, a preferred embodiment of the present invention will be explained below. FIG. 1 is a view showing a pickup guide mechanism of an embodiment of the present invention. In this connection, like reference characters are used to indicate like parts in FIGS. 1 and 4, and the redundant explanations are omitted here.

Figure 4:
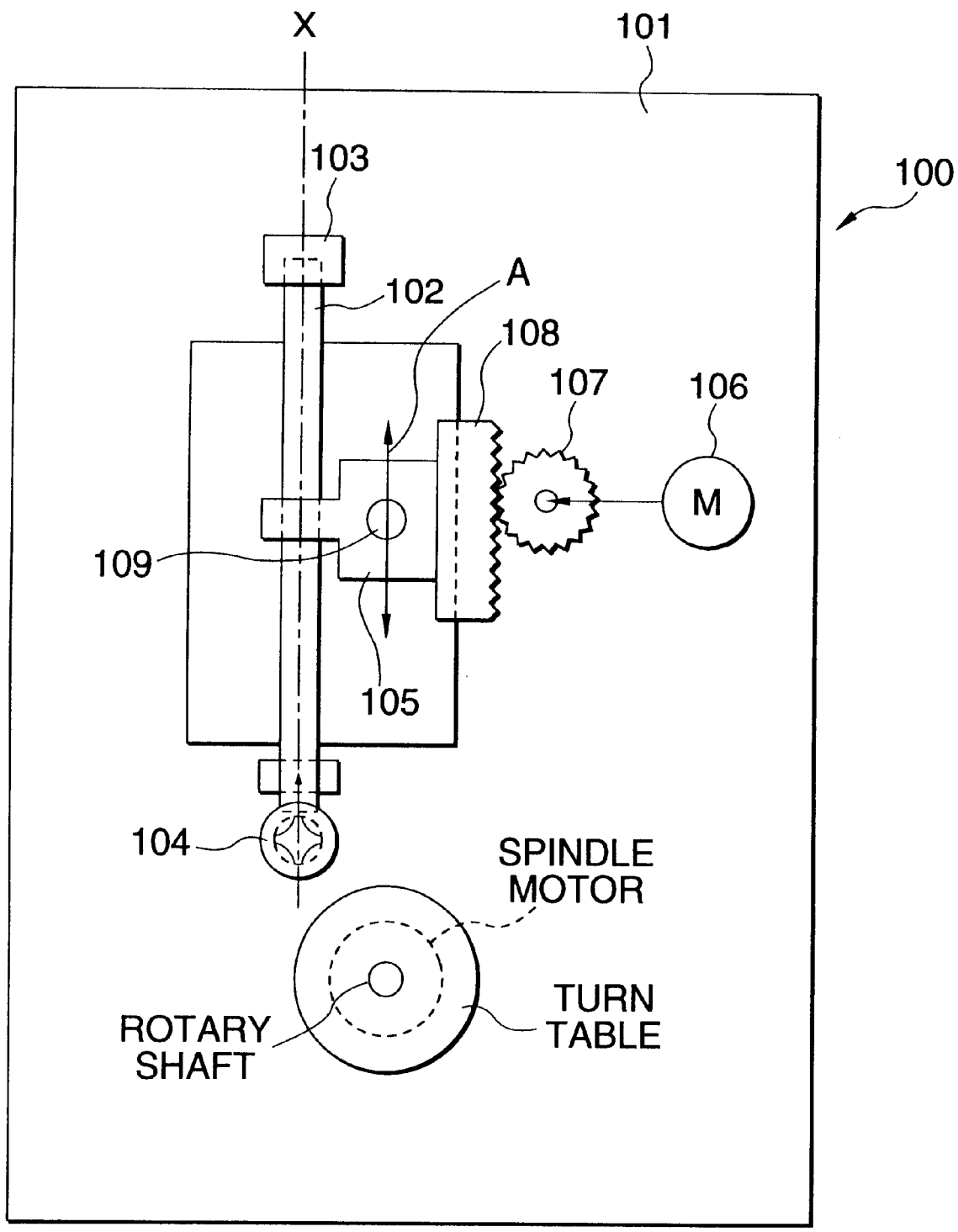
FIG. 4 is a view showing a conventional pickup guide mechanism.

In FIG. 1, the pickup guide mechanism 1 includes a screw part 2 instead of the countersunk head screw 104 used in the conventional pickup guide mechanism 100 shown in FIG. 4. The pickup guide mechanism 1 includes a fixing means composed of a shaft presser 103 and a screw part 1.

The fixing means is composed as follows. A recessed portion of the shaft presser 103 comes into contact with one end portion of the guide shaft 102, so that the guide shaft 102 can be positioned. The screw part 2 screwed into the chassis 101 fixes the other end portion of the guide shaft 102. Due to the foregoing, the guide shaft 102 is arranged over an opening formed on the chassis 101 in the radial direction of the disk, that is, the guide shaft 102 is arranged in the direction of arrow A in FIG. 1.

The central axis of the screw part 2, which is screwed to the chassis 101, is located on central axis X of the guide shaft 102 arranged at a predetermined position as shown in FIG. 1, and the central axis of the countersunk head screw 104 makes a right angle with central axis X of the guide shaft 102.

Therefore, when the screw part 2 is screwed to the chassis 101, the highest portion of one end of the guide shaft 102 comes into contact with an inclined face (tapered face) of the head portion of the screw part 2 forming angle θ'. Therefore, the highest portion of one end of the guide shaft 102 is pushed by force F" of the tapered face. In this case, force r of the tapered face is perpendicular to the tapered face.

Figure 2:
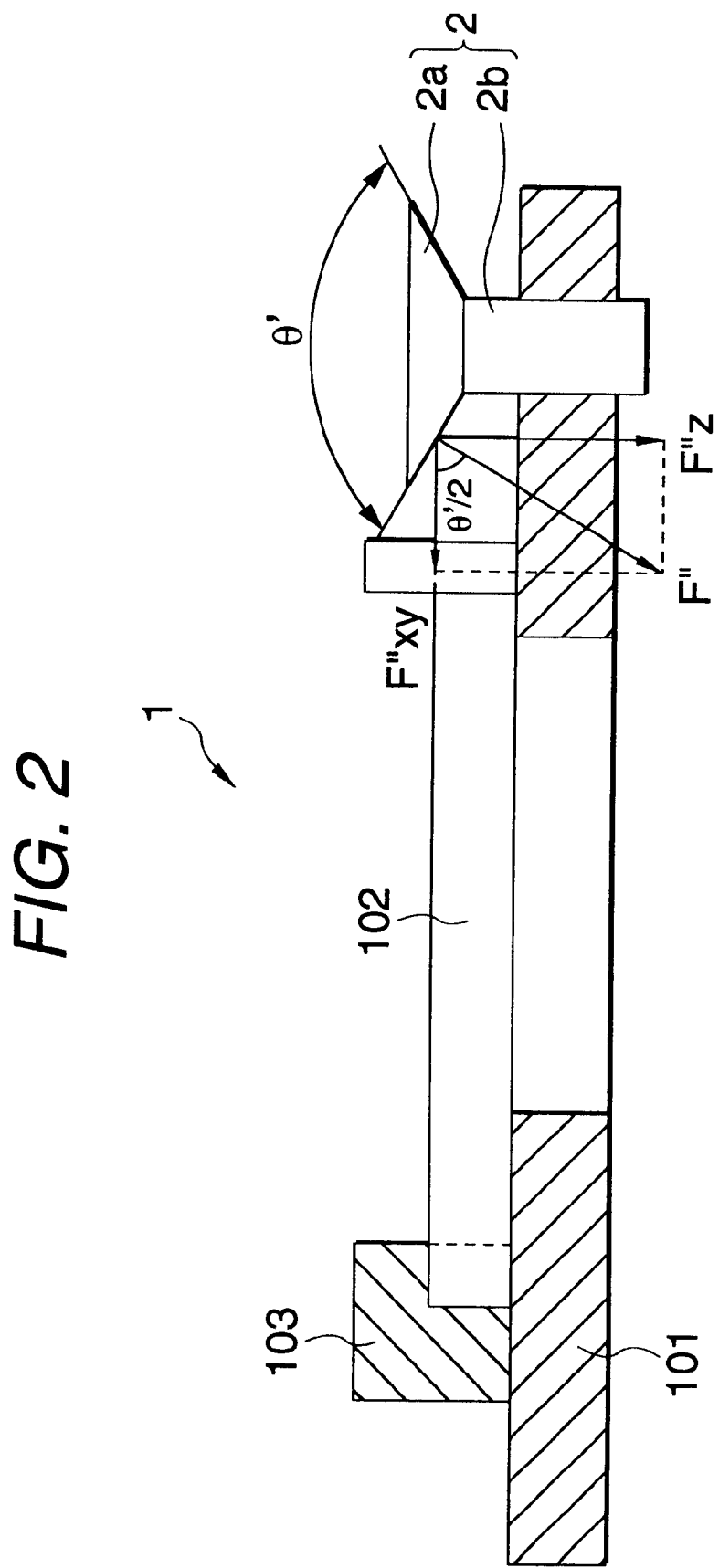
FIG. 2 is a view showing a guide shaft arranged and fixed onto a chassis by a screw part.

FIG. 2 is a view showing the guide shaft 102 fixed onto the chassis 101 by the screw part 2. The screw part 2 is composed of a head portion 2a and screw portion 2b. The head portion 2a has a tapered face in the same manner as that of the above countersunk head screw 104, however, angle θ' of the head portion 2a, which is a taper angle of the tapered face of the head portion 2a, is formed to be in a range which is larger than 90° and smaller than 160°.

The screw portion 2b of the screw part 2 is screwed to the chassis 101, so that the tapered face of the head portion 2a pushes the other end portion of the guide shaft 102 by force θ' which is perpendicular to the tapered face.

Figure 5:
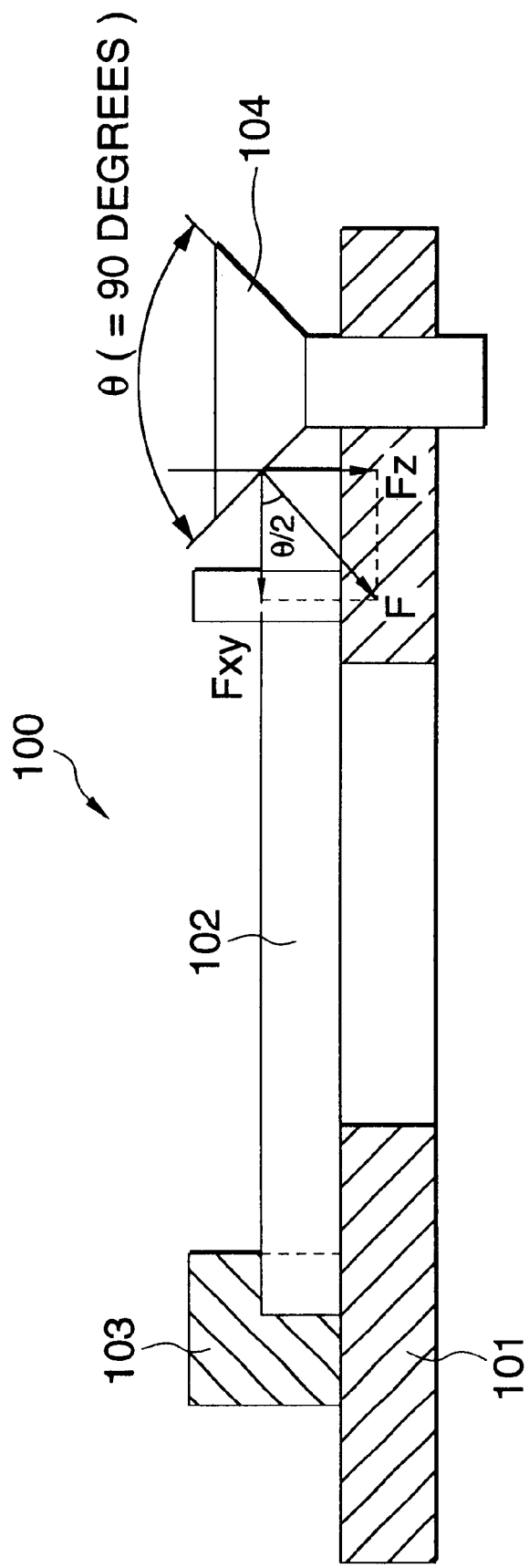
FIG. 5 is a view showing a guide shaft arranged and fixed onto a chassis by a countersunk head screw.
Figure 6:
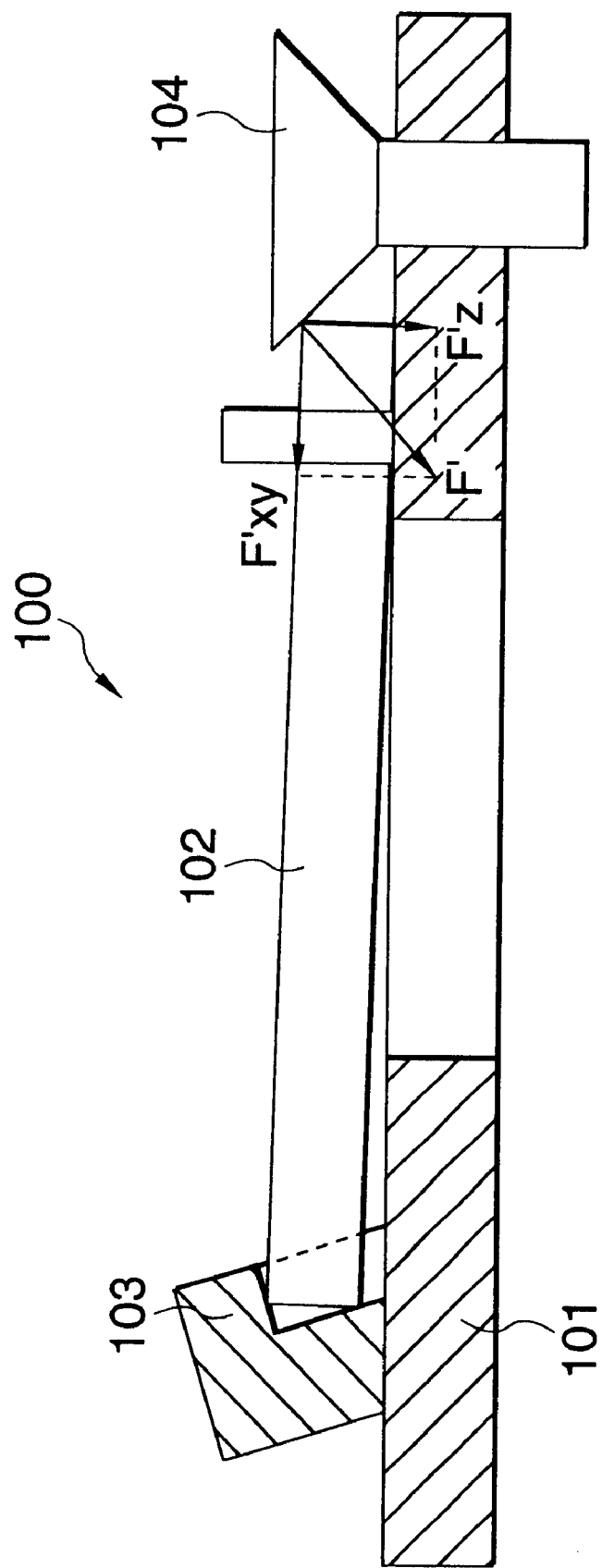
FIG. 6 is a view showing a shaft presser in a plastically deformed state.

The intensity of force F" is sufficiently higher than that of force F shown in FIG. 5. In this embodiment, the intensity of component force F"xy in the horizontal direction of force F" is made to be equal to the intensity of component force Fxy in the horizontal direction created by the countersunk head screw 104 in the pickup guide mechanism 100 shown in FIG. 5.

Force F" becomes a fastening force for fixing the guide shaft 102 to the chassis 101 by fastening the other end portion of the guide shaft 102 with the screw part 2 and the chassis 101. Force F"xy becomes a pushing force for pushing the other end portion of the guide shaft 102 toward the shaft presser 103 in such a manner that the guide shaft 102 is pushed in the same horizontal direction as the radial direction of the disk (shown by arrow A in FIG. 1) so that one end portion of the guide shaft 102 can be pushed against the shaft presser 102 in the horizontal direction and the guide shaft 102 can be positioned in the radial direction of the disk.

As can be seen in FIG. 2, an angle formed by force F" perpendicular to the tapered face and component force F"xy in the horizontal direction is θ'/2. Since angle θ' of the head portion 2a is formed to be larger than 90°, the intensity of component force F"z in the vertical direction is higher than the intensity of component force F"xy in the horizontal direction.

Accordingly, the intensity of component force F"z in the vertical direction is higher than the intensity of component force Fz in the vertical direction in the pickup guide mechanism 100 shown in FIG. 5. The intensity of component force F"z in the vertical direction of force F" is higher than the intensity of component force F"xy in the horizontal direction.

When the intensity of component force F"xy in the horizontal direction is low, the screw part 2 tends to loosen, and play tends to be caused between the guide shaft 102 and the shaft presser 103 in the process of positioning the guide shaft 102. For the above reasons, in order to prevent the occurrence of play in the case of positioning the guide shaft 102, angle θ' of the head portion 2a is kept to be smaller than 150°.

As described above, compared with the pickup guide mechanism 100 in which the countersunk head screw 104 is used, when the pickup guide mechanism 1 is used, one end portion of the guide shaft 102 can be fixed to the chassis 101 by a high intensity of fastening force F"z, and at the same time one end portion of the guide shaft 102 can be pushed to the shaft presser 103 in the horizontal direction by the same intensity of pushing force F"xy. Therefore, the other end portion of the guide shaft can be stably positioned in the horizontal direction without creating any play while no damage is caused in the shaft presser 103 and no deformation is caused on the chassis 101, and further one end portion of the guide shaft can be fixed to the chassis by a sufficiently high fastening force. As a result, it is possible to stably fix the guide shaft 102 of the pickup guide mechanism 1 at a predetermined position on the chassis 101 by a sufficiently high intensity of fastening force without damaging each portion of the pickup guide mechanism 1.

In this connection, in the above embodiment, the screw part 2 to be screwed to the chassis 101 is arranged in such a manner that the central axis of the screw part 2 makes a right angle with central axis X of the guide shaft 102 (shown in FIG. 1) on central axis X. Therefore, all component force F"xy in the horizontal direction of force F", which pushes the guide shaft 102 by the tapered face, pushes one end portion of the guide shaft 102 in the same direction as the radial direction of the disk. However, it should be noted that the present invention is not limited to the above specific embodiment. As shown by the pickup guide mechanism of another embodiment illustrated in FIG. 3, it is possible to adopt an arrangement in which a pushing force of the guide shaft 102 in the radial direction of the disk can be obtained by a portion of component force F"xy in the horizontal direction.

Figure 3:
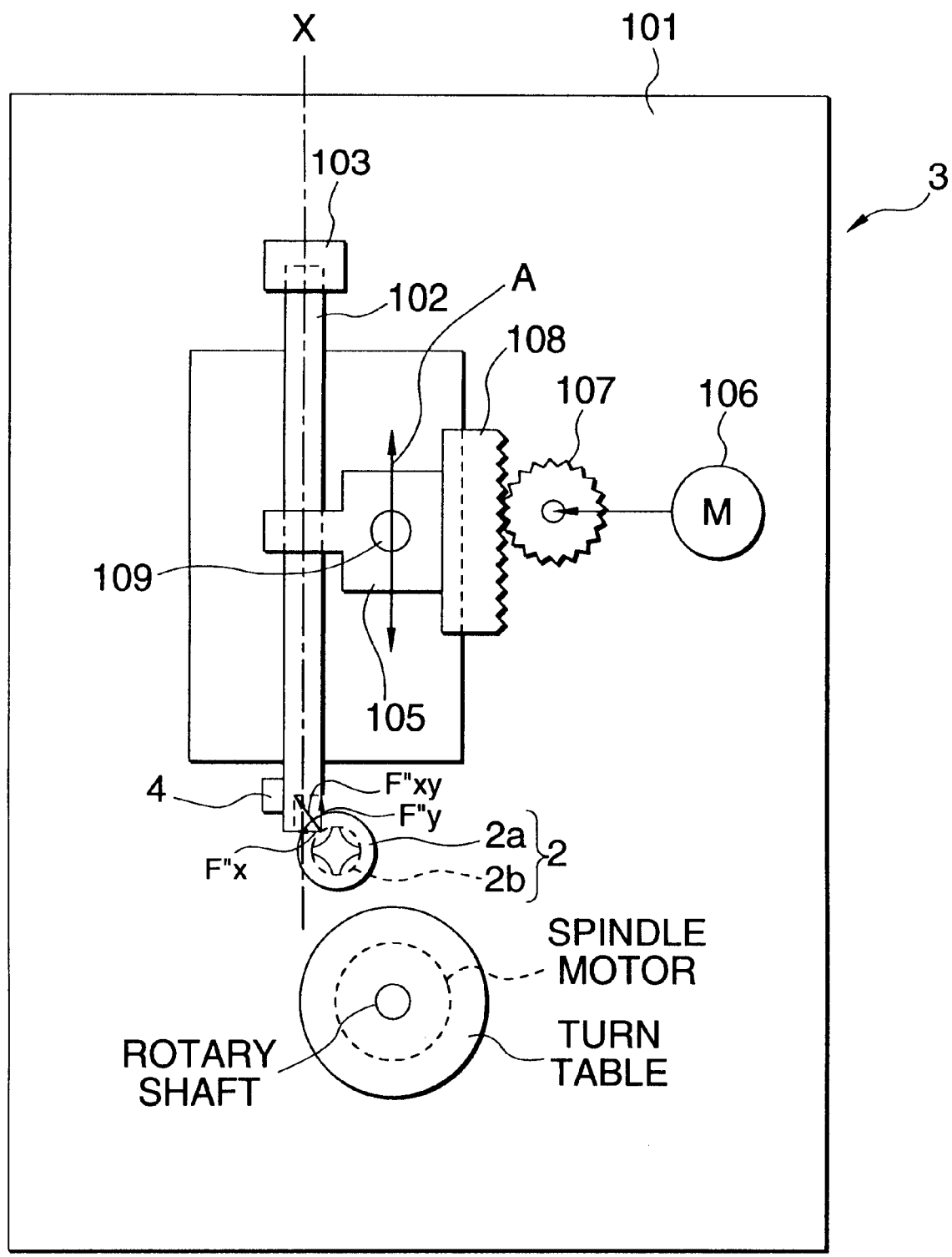
FIG. 3 is a view showing a pickup guide mechanism of another embodiment of the present invention.

The pickup guide mechanism 3 shown in FIG. 3 is an example in which the screw part 2 screwed to the chassis 101 of the pickup mechanism 1 shown in FIG. 1 deviates from central axis X. In this arrangement, in addition to the parts of the pickup guide mechanism 1, there is provided a protrusion 4 which is a position regulating means for regulating a position of the guide shaft on the chassis 101 in the horizontal direction.

In FIG. 3, an inclined face (tapered face), the inclination angle of which is θ', of the head portion of the screw part comes into contact with a portion of one end of the guide shaft 102 which deviates a little from the highest portion of one end of the guide shaft 102 to the right. Therefore, one end of the guide shaft 102 is pushed by force F", which is perpendicular to the tapered face, given from the tapered face concerned.

Force F" becomes a fastening force for fixing the guide shaft 102 to the chassis 101 by fastening the other end portion of the guide shaft 102 with the screw part 2 and the chassis 101. Component force F"y, the direction of which is the same as the radial direction (arrow A in FIG. 1) of the disk, of component force F"xy of force F" in the horizontal direction becomes a pushing force for positioning the guide shaft 102 in the radial direction of the disk.

Component force F"x in component force F"xy of force F" in the horizontal direction, which makes a right angle with the radial direction of the disk (arrow A in FIG. 1), makes the guide shaft 103 come into contact with the protrusion 4, so that the guide shaft 102 can be positioned at a predetermined position by this pushing force of component force F"x together with the shaft presser 103.

Accordingly, in this embodiment, the fixing means of the pickup guide mechanism 3 is composed of the shaft presser 103, screw part 1 and protrusion 4.

According to this embodiment, component force F"xy in the horizontal direction can be divided into component forces of two directions. Therefore, when a position of the screw hole formed on the chassis 101 is appropriately changed from central axis X, it is possible to adjust a ratio of component force F"x to component force F"y. Therefore, the other end portion of the guide shaft can be stably positioned in the horizontal direction without creating any play while no damage is caused in the shaft presser 103 and no deformation is caused on the chassis 101, and further one end portion of the guide shaft can be fixed to the chassis by a sufficiently high fastening force. As a result, it is possible to stably fix the guide shaft 102 of the pickup guide mechanism 3 at a predetermined position on the chassis 101 by a sufficiently high intensity of fastening force without damaging each portion of the pickup guide mechanism 3.

According to the present invention, it is possible to obtain a component force (pushing force) for pushing and positioning the guide shaft in the horizontal direction without creating any play of the guide shaft in the horizontal direction, from the pushing force for pushing one end of the guide shaft by the tapered face of the head portion of the countersunk head screw. Further, it is possible to increase the intensity of a component force (fastening force) for fastening the guide shaft by the countersunk head screw and the chassis as compared with the intensity of the pushing force concerned. As a result, it is possible to stably position the guide shaft by a pushing force without causing any play, and at the same time it is possible to fix the guide shaft to the chassis by a sufficiently high intensity of fastening force. As a result, in the pickup guide mechanism, the guide shaft can be stably fixed at a predetermined position on the chassis by a sufficiently high intensity of fastening force without causing any damage in each portion.

What is claimed is:

1. A pickup guide mechanism comprising:

a shaft for guiding a pickup over an opening formed on a chassis; and fixing means for fixing the shaft to the chassis, the fixing means including a countersunk head screw, which is screwed to the chassis, a tapered face of a head portion of which pushes an end portion of the guide shaft, wherein the taper angle of the tapered face of the head portion exceeds 90°.

2. A pickup guide mechanism comprising:

a shaft for guiding a pickup over an opening formed on a chassis; and fixing means for fixing the shaft to the chassis, the fixing means including a presser section, which is arranged on the chassis, for coming into contact with one end portion of the guide shaft and positioning the guide shaft, and a countersunk head screw, which is screwed to the chassis, a tapered face of a head portion of which pushes the other end portion of the guide shaft toward the presser section, wherein the taper angle of the tapered face of the head portion exceeds 90°.

* * * * *